US011209072B2

(12) United States Patent
Ghatti et al.

(10) Patent No.: US 11,209,072 B2
(45) Date of Patent: Dec. 28, 2021

(54) AXLE ASSEMBLY HAVING A MULTI-SPEED TRANSMISSION

(71) Applicant: ArvinMeritor Technology, LLC, Troy, MI (US)

(72) Inventors: Chetankumar Ghatti, Troy, MI (US); Rodrigo Soffner, Osasco (BR); Christopher Keeney, Troy, MI (US); Mark Smith, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 220 days.

(21) Appl. No.: 16/594,932

(22) Filed: Oct. 7, 2019

(65) Prior Publication Data

US 2021/0102608 A1 Apr. 8, 2021

(51) Int. Cl.
| | |
|---|---|
| *F16H 3/12* | (2006.01) |
| *B60K 17/24* | (2006.01) |
| *F16H 48/05* | (2012.01) |
| *B60K 17/16* | (2006.01) |
| *B60K 1/00* | (2006.01) |

(52) U.S. Cl.
CPC ........... *F16H 3/126* (2013.01); *B60K 17/165* (2013.01); *B60K 17/24* (2013.01); *F16H 48/05* (2013.01); *B60K 1/00* (2013.01)

(58) Field of Classification Search
CPC ......... F16H 3/126; F16H 48/05; B60K 17/24; B60K 1/00
See application file for complete search history.

(56) References Cited

U.S. PATENT DOCUMENTS

| | | | |
|---|---|---|---|
| 1,981,236 A | 11/1934 | Logue | |
| 2,338,154 A | 1/1944 | Wilkinson | |
| 4,304,152 A | 12/1981 | Michling | |
| 5,603,671 A | 2/1997 | Schmidt | |
| 6,176,146 B1 | 1/2001 | Ore | |
| 6,216,560 B1 | 4/2001 | Takada et al. | |
| 7,530,912 B2 | 5/2009 | Kramer | |
| 7,798,937 B2 | 9/2010 | Gitt | |
| 8,858,379 B2 | 10/2014 | Keeney et al. | |
| 10,975,942 B1 * | 4/2021 | Soffner | B60K 1/00 |
| 11,001,140 B1 * | 5/2021 | Varela | F16C 19/06 |
| 11,034,237 B2 * | 6/2021 | Hirao | F16H 59/041 |
| 2003/0125150 A1 | 7/2003 | Tanzer | |

(Continued)

FOREIGN PATENT DOCUMENTS

| | | |
|---|---|---|
| DE | 2005047 A1 | 8/1971 |
| DE | 3036465 A1 | 5/1982 |

(Continued)

OTHER PUBLICATIONS

Extended European Search Report dated Mar. 3, 2021 for related European Appln. No. 20197309.6; 15 pages.

(Continued)

*Primary Examiner* — Erez Gurari
(74) *Attorney, Agent, or Firm* — Brooks Kushman PC

(57) ABSTRACT

An axle assembly having a countershaft transmission. The countershaft transmission may operatively connect a rotor shaft of an electric motor to a drive pinion that may be rotatable about a drive pinion axis. The electric motor and the countershaft transmission may be positioned on opposite sides of a differential assembly.

20 Claims, 6 Drawing Sheets

(56) References Cited

U.S. PATENT DOCUMENTS

| | | |
|---|---|---|
| 2005/0124450 A1 | 6/2005 | Gady et al. |
| 2005/0176543 A1* | 8/2005 | Kirkwood ............... B60K 17/35 |
| | | 475/5 |
| 2005/0187058 A1* | 8/2005 | Teraoka ............. B60K 23/0808 |
| | | 475/5 |
| 2006/0094552 A1 | 5/2006 | Duncan |
| 2007/0275816 A1 | 11/2007 | Henderson |
| 2008/0146396 A1 | 6/2008 | Millar |
| 2010/0000807 A1 | 1/2010 | Rodriguez et al. |
| 2011/0111910 A1 | 5/2011 | Ideshio et al. |
| 2012/0238387 A1 | 9/2012 | Stuart |
| 2013/0005526 A1 | 1/2013 | Matsubara et al. |
| 2013/0017927 A1 | 1/2013 | Morscheck et al. |
| 2013/0296094 A1 | 11/2013 | Mack et al. |
| 2014/0087906 A1* | 3/2014 | Keeney ..................... B60K 1/00 |
| | | 475/150 |
| 2014/0262675 A1 | 9/2014 | Sugiyama et al. |
| 2014/0274529 A1 | 9/2014 | Edler et al. |
| 2014/0311266 A1 | 10/2014 | Nakashima et al. |
| 2015/0151634 A1 | 6/2015 | Smetana |
| 2015/0330492 A1 | 11/2015 | Lee et al. |
| 2016/0053880 A1 | 2/2016 | Peura |
| 2017/0057349 A1 | 3/2017 | Ogawa et al. |
| 2017/0059007 A1 | 3/2017 | Eo et al. |
| 2018/0015816 A1 | 1/2018 | Robinette et al. |
| 2018/0112770 A1 | 4/2018 | Hansson et al. |
| 2018/0287467 A1* | 10/2018 | Ogino ..................... H02K 7/116 |
| 2018/0370356 A1* | 12/2018 | Shigeta .................. F16D 23/02 |
| 2019/0054816 A1* | 2/2019 | Garcia .................... F16H 48/08 |
| 2019/0054817 A1 | 2/2019 | Garcia et al. |
| 2019/0054818 A1* | 2/2019 | Garcia ..................... B60K 1/00 |
| 2020/0122573 A1* | 4/2020 | Nishizawa ............... B60K 1/00 |
| 2020/0189375 A1* | 6/2020 | Hayashi ................... B60K 1/00 |
| 2021/0101478 A1* | 4/2021 | Ghatti ...................... B60K 1/00 |
| 2021/0102607 A1* | 4/2021 | Ghatti ................... F16H 3/089 |
| 2021/0102608 A1* | 4/2021 | Ghatti ................... F16H 3/126 |
| 2021/0102609 A1* | 4/2021 | Ghatti ................... F16H 3/097 |
| 2021/0107443 A1* | 4/2021 | Yamamoto ............ B60W 10/08 |
| 2021/0122239 A1* | 4/2021 | Fujii ......................... B60K 6/52 |
| 2021/0138885 A1* | 5/2021 | Engerman .............. B60K 17/16 |

FOREIGN PATENT DOCUMENTS

| | | |
|---|---|---|
| DE | 1120262 A1 | 5/1992 |
| DE | 19827756 A1 | 12/1999 |
| DE | 19915926 A1 | 3/2000 |
| DE | 19952625 A1 | 6/2001 |
| DE | 10049197 A1 | 4/2002 |
| DE | 10226572 A1 | 1/2004 |
| DE | 102004038882 A1 | 3/2005 |
| DE | 10 2011 110258 A1 | 12/2011 |
| DE | 102010061217 A1 | 6/2012 |
| DE | 102011007253 A1 | 10/2012 |
| DE | 102011007257 A1 | 10/2012 |
| DE | 102011007268 A1 | 10/2012 |
| EP | 3677414 A2 | 10/1995 |
| EP | 1512884 A2 | 3/2005 |
| EP | 2444265 A1 | 4/2012 |
| EP | 3 276 203 A1 | 1/2018 |
| EP | 3 501 867 A1 | 6/2019 |
| JP | S57059124 U | 4/1982 |
| JP | H04185207 A | 7/1992 |
| JP | 2003019911 A | 1/2003 |
| WO | 2013029682 A1 | 3/2013 |
| WO | 2014/079746 A1 | 5/2014 |
| WO | 2015/126719 A1 | 8/2015 |
| WO | 2016132800 A1 | 8/2016 |
| WO | 2017114423 A1 | 7/2017 |

OTHER PUBLICATIONS

Dhanapal Vittala Raya, et al., U.S. Appl. No. 16/205,586, filed with the United States Patent and Trademark Office filed Nov. 30, 2018.
Mark Smith, et al., U.S. Appl. No. 16/205,623, filed with the United States Patent and Trademark Office filed Nov. 30, 2018.
Mark Smith, et al., U.S. Appl. No. 16/206,182, filed with the United States Patent and Trademark Office filed Nov. 30, 2018.
Rodrigo Soffner, et al., U.S. Appl. No. 16/205,663, filed with the United States Patent and Trademark Office filed Nov. 30, 2018.
Angel Begov, et al., U.S. Appl. No. 16/205,717, filed with the United States Patent and Trademark Office filed Nov. 30, 2018.
Mark Smith, et al., U.S. Appl. No. 16/205,771, filed with the United States Patent and Trademark Office filed Nov. 30, 2018.
Tao Peng, et al., U.S. Appl. No. 16/205,850, filed with the United States Patent and Trademark Office filed Nov. 30, 2018.
Chetankumar Ghatti, et al., U.S. Appl. No. 16/594,362, filed with the United States Patent and Trademark Office filed Oct. 7, 2019.
Chetankumar Ghatti, et al., U.S. Appl. No. 16/594,702, filed with the United States Patent and Trademark Office filed Oct. 7, 2019.
Chetankumar Ghatti, et al., U.S. Appl. No. 16/594,875, filed with the United States Patent and Trademark Office filed Oct. 7, 2019.

* cited by examiner

AXLE ASSEMBLY HAVING A MULTI-SPEED TRANSMISSION

TECHNICAL FIELD

This disclosure relates to an axle assembly having a multi-speed countershaft transmission that may operatively connect an electric motor to a drive pinion. A rotor shaft may function as a countershaft and may not extend through the drive pinion.

BACKGROUND

An axle assembly having an electric motor module is disclosed in U.S. Patent Publication No. 2019/0054816.

SUMMARY

In at least one embodiment, an axle assembly is provided. The axle assembly may include an electric motor, a rotor shaft, a drive pinion, a countershaft transmission, and a differential assembly. The electric motor may have a rotor that may be rotatable about a first axis. The rotor shaft may be rotatable about the first axis. The drive pinion may be rotatable about a drive pinion axis. The countershaft transmission may operatively connect the rotor shaft to the drive pinion. The differential assembly may be operatively connected to the drive pinion. The electric motor and the countershaft transmission may be positioned on opposite sides of the differential assembly.

In at least one embodiment, an axle assembly is provided. The axle assembly may include an electric motor, a rotor shaft, a drive pinion, a countershaft transmission, and a differential assembly. The electric motor may have a rotor that may be rotatable about a first axis. The rotor shaft may be operatively connected to the rotor and may be rotatable about the first axis. The drive pinion may be rotatable about a drive pinion axis that may be spaced apart from the first axis. The countershaft transmission may operatively connect the rotor shaft to the drive pinion. The countershaft transmission may include a set of countershaft gears that may be fixedly coupled to the rotor shaft and a set of drive pinion gears that may be selectively coupled to the drive pinion. The differential assembly may be operatively connected to the drive pinion. The electric motor and the countershaft transmission may be positioned on opposite sides of the differential assembly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
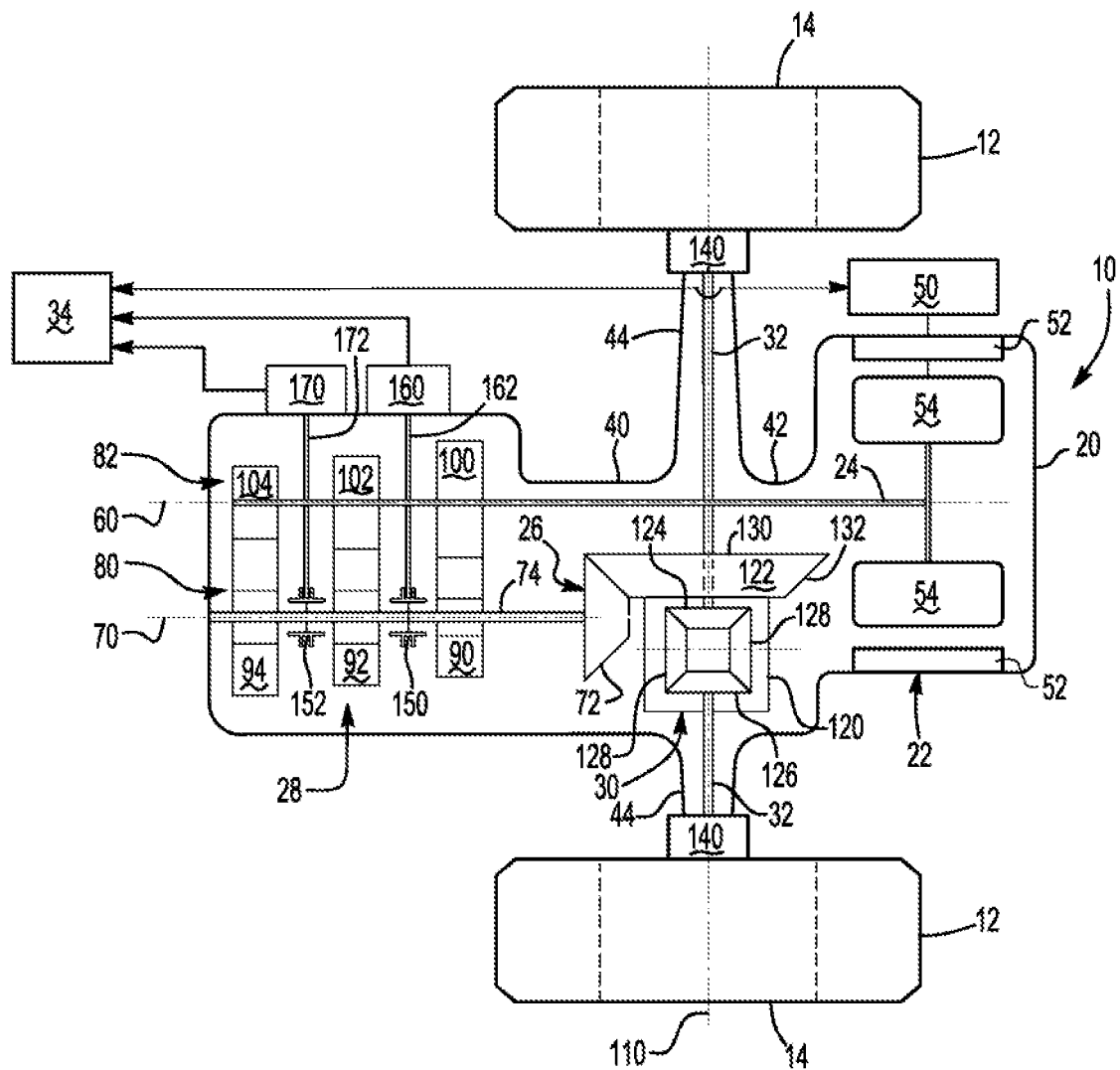
FIG. 1 shows an example of an axle assembly having a countershaft transmission in a neutral position.

Referring to FIG. 1, an example of an axle assembly 10 is shown. The axle assembly 10 may be provided with a motor vehicle like a car, truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may provide torque to one or more traction wheel assemblies that may include a tire 12 mounted on a wheel 14. One or more axle assemblies may be provided with the vehicle. In at least one configuration, the axle assembly 10 may include a housing assembly 20, an electric motor 22, a rotor shaft 24, a drive pinion 26, a countershaft transmission 28, a differential assembly 30, at least one axle shaft 32, and a control system 34.

The housing assembly 20 may facilitate mounting of the axle assembly 10 to the vehicle. In addition, the housing assembly 20 may receive various components of the axle assembly 10. For example, the housing assembly 20 may receive and support the electric motor 22, the rotor shaft 24, the drive pinion 26, the countershaft transmission 28, the differential assembly 30, the axle shafts 32, or combinations thereof. In at least one configuration, the housing assembly 20 may include an axle housing 40 that may have a center portion 42 and one or more arm portions 44.

The center portion 42 may be disposed proximate the center of the housing assembly 20. The center portion 42 may at least partially define a cavity that may receive the differential assembly 30. The center portion 42 may be made of one or more components and may facilitate mounting of a differential carrier that supports the differential assembly 30. A lower region of the center portion 42 may at least partially define a sump portion that may contain lubricant that may be splashed to lubricate internal components of the axle assembly 10, such as the differential assembly 30 and associated bearings. The center portion 42 may also facilitate mounting of various external components. For instance, the center portion 42 may facilitate mounting of the electric motor 22 and the countershaft transmission 28 to the housing assembly 20.

One or more arm portions 44 may extend from the center portion 42. For example, two arm portions 44 may extend in opposite directions from the center portion 42 and away from the differential assembly 30. The arm portions 44 may have substantially similar configurations. For example, the arm portions 44 may each have a hollow configuration or tubular configuration that may extend around a corresponding axle shaft 32 and may help separate or isolate the axle shaft 32 from the surrounding environment. An arm portion 44 or a portion thereof may be integrally formed with the center portion 42. Alternatively, an arm portion 44 may be separate from the center portion 42. In such a configuration, each arm portion 44 may be attached to the center portion 42 in any suitable manner, such as by welding or with one or more fasteners. Each arm portion 44 may define an arm cavity that may receive a corresponding axle shaft 32. It is also contemplated that the arm portions 44 may be omitted.

The electric motor 22 may provide torque to the differential assembly 30 via the rotor shaft 24, the countershaft transmission 28, and the drive pinion 26. In addition, the electric motor 22 may be electrically connected to an electrical power source 50, such as a battery, capacitor, or the like. An inverter may electrically connect the electric motor 22 and the electrical power source 50. The electric motor 22 may have any suitable configuration. In at least one configuration, the electric motor 22 may include a stator 52 and a rotor 54.

The stator 52 may be fixedly positioned with respect to the housing assembly 20. For example, the stator 52 may extend around a first axis 60 and may not rotate about the first axis 60. The stator 52 may include windings that may be electrically connected to the electrical power source 50.

The rotor 54 may extend around the first axis 60 and may be received inside the stator 52. The rotor 54 may be rotatable about the first axis 60 with respect to the stator 52. For example, the rotor 54 may be spaced apart from the stator 52 and may include magnets or ferromagnetic material that may facilitate the generation of electrical current. The rotor 54 may be operatively connected to the countershaft transmission 28 via the rotor shaft 24 as will be discussed in more detail below.

The rotor shaft 24 may operatively connect the electric motor 22 to the countershaft transmission 28. For example, the rotor shaft 24 may extend from the rotor 54 or may be operatively connected to the rotor 54 such that the rotor 54 and the rotor shaft 24 may be rotatable together about a first axis 60. The rotor shaft 24 may be fixedly coupled to the rotor 54 at or proximate a first end of the rotor shaft 24 and may be fixedly coupled to the countershaft transmission 28 proximate a second end that may be disposed opposite the first end. The rotor shaft 24 may support gears of the countershaft transmission 28 and may function as a countershaft. The rotor shaft 24 may have a greater length than the drive pinion 26. The rotor shaft 24 may be rotatable about the first axis 60. For instance, the rotor shaft 24 may be rotatably supported on the housing assembly 20 by one or more roller bearing assemblies. As an example, a roller bearing assembly may be located near opposing first and second ends the rotor shaft 24. The roller bearing assembly may have any suitable configuration. For instance, the roller bearing assembly may include a plurality of rolling elements that may be disposed between an inner race and an outer race. The inner race may be mounted to the rotor shaft 24 and may extend around and may receive the rotor shaft 24. The outer race may extend around the inner race and may be mounted to the housing assembly 20.

The drive pinion 26 may be at least partially received in the housing assembly 20. The drive pinion 26 may be selectively connected to the electric motor 22. As such, the drive pinion 26 may help operatively connect the electric motor 22 to components of the axle assembly 10 like the differential assembly 30. The drive pinion 26 may extend along and may be rotatable about a drive pinion axis 70. The drive pinion axis 70 may be disposed parallel or substantially parallel to the first axis 60 and may be spaced apart from the first axis 60 in one or more embodiments. The drive pinion 26 may be indirectly connected to the electric motor 22 via the rotor shaft 24 and the countershaft transmission 28. In at least one configuration, the drive pinion 26 may include a gear portion 72 and a shaft portion 74.

The gear portion 72 may be disposed at or near an end of the drive pinion 26. The gear portion 72 may have a plurality of teeth that may mate or mesh with corresponding teeth on a ring gear of the differential assembly 30 as will be discussed in more detail below. As such, the drive pinion 26 may provide torque from the electric motor 22 to the ring gear.

The shaft portion 74 may extend along and may be rotatable about the drive pinion axis 70 with the gear portion 72. The shaft portion 74 may be operatively connected to the countershaft transmission 28 and may extend from the gear portion 72 in a direction that may extend away from the electric motor 22 and that may extend toward the countershaft transmission 28. The shaft portion 74 may be integrally formed with the gear portion 72 or may be provided as a separate component that may be fixedly coupled to the gear portion 72.

The countershaft transmission 28 may operatively connect the electric motor 22 to the drive pinion 26. The countershaft transmission 28 may be spaced apart from the electric motor 22 such that the differential assembly 30 may be positioned between the countershaft transmission 28 and the electric motor 22. In at least one configuration, the countershaft transmission 28 may include a set of drive pinion gears 80 and a set of countershaft gears 82.

The set of drive pinion gears 80 may include a plurality of gears that may be selectively coupled to the drive pinion 26. In the configuration shown, the set of drive pinion gears 80 includes a first gear 90, a second gear 92, and a third gear 94; however, it is to be understood that a greater or lesser number of gears may be provided. A member of the set of drive pinion gears 80 may be rotatable about the drive pinion axis 70 with the drive pinion 26 when that gear is coupled to the drive pinion 26. Conversely, the drive pinion 26 may be rotatable about the drive pinion axis 70 with respect to a member of the set of drive pinion gears 80 that is decoupled from or not coupled to the drive pinion 26. A member of the set of drive pinion gears 80 may be selectively coupled to the drive pinion 26 in any suitable manner, such as with a clutch as will be discussed in more detail below. In at least one configuration, no more than one gear of the set of drive pinion gears 80 may be coupled to the drive pinion 26 at the same time when the drive pinion 26 rotates about the drive pinion axis 70.

The first gear 90 may receive the shaft portion 74 of the drive pinion 26. For example, the first gear 90 may have a through hole through which the shaft portion 74 may extend. The first gear 90 may extend around the drive pinion axis 70 and the shaft portion 74 and may have a plurality of teeth that may be arranged around and may face away from the drive pinion axis 70. The teeth of the first gear 90 may contact and may mate or mesh with teeth of a first countershaft gear that may be provided with the set of countershaft gears 82 as will be discussed in more detail below. In at least one configuration, the first gear 90 may be axially positioned along the drive pinion axis 70 such that the first gear 90 is positioned closer to the electric motor 22 and the differential assembly 30 than some or all of the other members of the set of drive pinion gears 80.

The second gear 92 may receive the shaft portion 74 of the drive pinion 26. For example, the second gear 92 may have a through hole through which the shaft portion 74 may extend. The second gear 92 may extend around the drive pinion axis 70 and the shaft portion 74 and may have a plurality of teeth that may be arranged around and may face away from the drive pinion axis 70. The teeth of the second gear 92 may contact and may mate or mesh with teeth of a second countershaft gear that may be provided with the set of countershaft gears 82 as will be discussed in more detail below. The second gear 92 may have a different diameter than the first gear 90 and the third gear 94. For example, the second gear 92 may have a larger diameter than the first gear 90 and a smaller diameter than the third gear 94 in at least one configuration, the second gear 92 may be axially positioned along the drive pinion axis 70 between the first gear 90 and the third gear 94.

The third gear 94 may receive the shaft portion 74 of the drive pinion 26. For example, the third gear 94 may have a through hole through which the shaft portion 74 may extend. The third gear 94 may extend around the drive pinion axis 70 and the shaft portion 74 and may have a plurality of teeth that may be arranged around and may face away from the drive pinion axis 70. The teeth of the third gear 94 may contact and may mate or mesh with teeth of a third countershaft gear that may be provided with the set of countershaft gears 82 as will be discussed in more detail below. The third gear 94 may have a different diameter than the first gear 90 and the second gear 92. For example, the third gear 94 may have a larger diameter than the first gear 90 and the second gear 92. In at least one configuration, the third gear 94 be axially positioned along the drive pinion axis 70 further from the electric motor 22 and the differential assembly 30 than the first gear 90 and the second gear 92.

Optionally, a bearing such as a roller bearing may receive the shaft portion 74 and may rotatably support a corresponding gear. For instance, a bearing may be received between the first gear 90 and the shaft portion 74, between the second gear 92 and the shaft portion 74, between the third gear 94 and the shaft portion 74, or combinations thereof to facilitate rotation of the drive pinion 26 with respect to a gear when the gear is not coupled to the drive pinion 26.

The set of countershaft gears 82 may be at least partially received in the housing assembly 20. The set of countershaft gears 82 may include a plurality of gears. Members of set of countershaft gears 82 may be rotatable about the first axis 60 with the rotor shaft 24. In the configuration shown, the set of countershaft gears 82 may include a first countershaft gear 100, a second countershaft gear 102, and a third countershaft gear 104; however, it is contemplated that a greater number of gears or a lesser number of countershaft gears may be provided. The set of countershaft gears 82 may be the only countershaft gears provided and thus a second countershaft or second countershaft subassembly may not be provided.

The first countershaft gear 100 may be fixedly disposed on the rotor shaft 24 or fixedly mounted to the rotor shaft 24. As such, the first countershaft gear 100 may rotate about the first axis 60 with the rotor shaft 24. For example, the first countershaft gear 100 may have a hole that may receive the rotor shaft 24 and may be fixedly coupled to the rotor shaft 24. The first countershaft gear 100 may extend around the first axis 60 and may have a plurality of teeth that may be arranged around and may face away from the first axis 60. The teeth of the first countershaft gear 100 may contact and may mate or mesh with the teeth of the first gear 90. In at least one configuration, the first countershaft gear 100 may be axially positioned along the first axis 60 closer to the electric motor 22 and the differential assembly 30 than the second countershaft gear 102 and the third countershaft gear 104.

The second countershaft gear 102 may be fixedly disposed on the rotor shaft 24 or fixedly mounted to the rotor shaft 24. As such, the second countershaft gear 102 may rotate about the first axis 60 with the rotor shaft 24. For example, the second countershaft gear 102 may have a hole that may receive the rotor shaft 24 and may be fixedly coupled to the rotor shaft 24. The second countershaft gear 102 may extend around the first axis 60 and may have a plurality of teeth that may be arranged around and may face away from the first axis 60. The teeth of the second countershaft gear 102 may contact and may mate or mesh with the teeth of the second gear 92. The second countershaft gear 102 may have a different diameter than the first countershaft gear 100 and the third countershaft gear 104. In at least one configuration, the second countershaft gear 102 may be axially positioned along the first axis 60 between the first countershaft gear 100 and the third countershaft gear 104.

The third countershaft gear 104 may be fixedly disposed on the rotor shaft 24 or fixedly mounted to the rotor shaft 24. As such, the third countershaft gear 104 may rotate about the first axis 60 with the rotor shaft 24. For example, the third countershaft gear 104 may have a hole that may receive the rotor shaft 24 and may be fixedly coupled to the rotor shaft 24. The third countershaft gear 104 may extend around the first axis 60 and may have a plurality of teeth that may be arranged around and may face away from the first axis 60. The teeth of the third countershaft gear 104 may contact and may mate or mesh with the teeth of the third gear 94. The third countershaft gear 104 may have a different diameter than the first countershaft gear 100 and the second countershaft gear 102. In at least one configuration, the third countershaft gear 104 may be axially positioned along the first axis 60 further away from the electric motor 22 and the differential assembly 30 than the first countershaft gear 100 and the second countershaft gear 102.

The first gear 90 and the first countershaft gear 100 may provide a different gear ratio than the second gear 92 and the second countershaft gear 102 and may provide a different gear ratio than the third gear 94 and the third countershaft gear 104. As a non-limiting example, the first gear 90 and the first countershaft gear 100 may provide a gear ratio of 1:1 or less, the second gear 92 and the second countershaft gear 102 may provide a gear ratio from 1:1 to 2:1, and the third gear 94 and the third countershaft gear 104 may provide a gear ratio of 2:1 or more. For instance, the first countershaft gear 100 may have a larger diameter than the first gear 90, the second countershaft gear 102, and the third countershaft gear 104. The second countershaft gear 102 may have a larger diameter than the third countershaft gear 104 and a smaller diameter or the same diameter as the second gear 92. The third countershaft gear 104 may have a smaller diameter than the third gear 94.

It is also contemplated that other gear configurations may be provided. As one example, the first gear 90 may have a larger diameter than the second gear 92 and the third gear 94. As another example, gears or gear pairings may be arranged in different sequences along their respective axes. As another example, multiple meshing gear pairings or no gear pairings may provide "overdrive" gear ratios of less than 1:1. As another example, multiple meshing gear pairings may provide gear ratios of greater than 1:1. As such, gear ratios may be provided that are greater than 1:1, less than 1:1, equal (i.e., 1:1), or combinations thereof.

The teeth of the countershaft gears may be of any suitable type. As a non-limiting example, the meshing teeth of the members of the set of drive pinion gears 80 and the members of the set of countershaft gears 82 may have a helical configuration.

The differential assembly 30 may be at least partially received in the center portion 42 of the housing assembly 20. The differential assembly 30 may transmit torque to the vehicle traction wheel assemblies and permit the traction wheel assemblies to rotate at different velocities. For example, the differential assembly 30 may be operatively connected to the axle shafts 32 and may permit the axle shafts 32 to rotate at different rotational speeds about a second axis 110. The second axis 110 may be disposed perpendicular or substantially perpendicular to the first axis 60 and the drive pinion axis 70. Moreover, the electric motor 22 may be positioned on an opposite side of the second axis 110 from the drive pinion 26, the countershaft transmission 28, or both. In at least one configuration, the differential assembly 30 may include a differential case 120, a ring gear 122, a first differential gear 124, a second differential gear 126, and at least one pinion gear 128.

The differential case 120 may be configured to receive components of the differential assembly 30. In addition, the differential case 120 may be rotatable about the second axis 110. For example, the differential case 120 may be rotatably supported by a pair of roller bearing assemblies, which in turn may be mounted to a portion of the housing assembly 20, such as a differential carrier. The differential case 120 may at least partially define a cavity that may at least partially receive the first differential gear 124, second differential gear 126, and pinion gear(s) 128.

The ring gear 122 may be fixedly disposed on the differential case 120 or fixedly mounted to the differential case 120. As such, the ring gear 122 may rotate about the second axis 110 with the differential case 120. The ring gear 122 may extend around the second axis 110 and may have a back side 130 and a set of ring gear teeth 132.

The back side 130 may face away from the gear portion 72 of the drive pinion 26. The back side 130 may also face away from the differential case 120, the second differential gear 126, the pinion gears 128, or combinations thereof.

The set of ring gear teeth 132 may be arranged around and may face away from the second axis 110 and many face away from or be disposed opposite the back side 130. The teeth of the ring gear 122 may contact and mate or mesh with teeth of the gear portion 72 of the drive pinion 26. As such, torque may be transmitted between the countershaft transmission 28 and the differential assembly 30 via the meshing teeth of the drive pinion 26 and the ring gear 122.

The first differential gear 124 may be disposed in the differential case 120. In addition, the first differential gear 124 may be coupled to an axle shaft 32 such that the axle shaft 32 and the first differential gear 124 are rotatable together about the second axis 110. The first differential gear 124 may be coupled to the axle shaft 32 in any suitable manner. For instance, the first differential gear 124 may have a hole that may receive the axle shaft 32 and the axle shaft 32 and first differential gear 124 may be coupled with mating splines, a weld, fastener, or the like. The first differential gear 124 may also have gear portion that may have a set of teeth that may be arranged around the second axis 110 and that may mate or mesh with teeth on one or more pinion gears 128.

The second differential gear 126 may be disposed in the differential case 120. The second differential gear 126 may be spaced apart from the first differential gear 124 and may have a similar or identical configuration as the first differential gear 124. As such, the second differential gear 126 may be coupled to another axle shaft 32 in any suitable manner such that the axle shaft 32 and the second differential gear 126 are rotatable together about the second axis 110. The second differential gear 126 may also have gear portion that may have a set of teeth that may be arranged around the second axis 110 and that may mate or mesh with teeth on one or more pinion gears 128.

At least one pinion gear 128 may be received in the differential case 120. A pinion gear 128 may include a set of teeth that mate or mesh with teeth on the first differential gear 124 and teeth on the second differential gear 126. In addition, a pinion gear 128 may be rotatable with respect to the differential case 120 or rotatably mounted on the differential case 120. For instance, a pinion gear 128 may receive and may be rotatable about a shaft or a spider that may extend from or may be mounted to the differential case 120 such that the shaft or spider is rotatable about the second axis 110 with the differential case 120.

The axle shafts 32 may transmit torque from the differential assembly 30 to corresponding traction wheel assemblies. For example, two axle shafts 32 may be provided such that each axle shaft 32 extends into or through a different arm portion 44 of housing assembly 20. The axle shafts 32 may extend along and may be rotatable about the second axis 110. Each axle shaft 32 may have a first end and a second end. The first end may be operatively connected to the differential assembly 30. The second end may be disposed opposite the first end and may be operatively connected to a corresponding wheel end assembly that may have a wheel hub that may support a wheel 14. Optionally, gear reduction may be provided between an axle shaft 32 and a wheel 14, such as with a gear reduction unit 140 having any suitable configuration. For instance, the gear reduction unit 140 may be configured with bevel gears or a planetary gear set in a manner known by those skilled in the art.

The control system 34 may control operation of the axle assembly 10. The control system 34 may include one or more electronic controllers, such as a microprocessor-based controller, that may monitor and/or control operation of various components of the axle assembly 10, such as the electric motor 22 and the electrical power source 50. In addition, the control system 34 may control coupling and decoupling of the gears of the set of drive pinion gears 80 to and from the drive pinion 26. For instance, the control system 34 may control operation of one or more clutches that may couple/decouple at least one member of the set of drive pinion gears 80 to/from the drive pinion 26.

A clutch may have any suitable configuration. The clutch may be configured as a disc clutch that may include friction discs that may be selectively engaged to couple a gear to a corresponding shaft. Alternatively, the clutch may be configured as a dog clutch or clutch collar that may receive, rotate with, and slide along a corresponding shaft to selectively couple and decouple one or more members of the set of drive pinion gears 80 to the drive pinion 26. For example, a clutch that is configured as a dog clutch or a clutch collar may have a through hole that may receive the shaft portion 74 of the drive pinion 26 and may rotate about the drive pinion axis 70 with the shaft portion 74. For instance, the clutch and shaft portion 74 may have mating splines that inhibit rotation of the clutch with respect to the shaft portion 74 while allowing the clutch to slide in an axial direction along the drive pinion axis 70 with respect to the shaft portion 74 to engage or disengage a member of the set of drive pinion gears 80. Such a clutch may have a tooth or teeth that may be configured to selectively mate or mesh with corresponding teeth on a member of the set of drive pinion gears 80 to couple the gear to the shaft portion 74 such that the gear rotates about the drive pinion axis 70 with the drive pinion 26. The tooth or teeth of the clutch may be configured as a face gear that may be disposed along a lateral side of the clutch or may be configured like a spline and may be received inside a hole of a member of the set of drive pinion gears 80. Clutches will primarily be described below as having a dog clutch or clutch collar configuration; however, it is to be understood that a clutch may have a different configuration and may not be configured as a dog clutch or a clutch collar, that a different number of clutches may be provided, and that clutches may be associated with a single member of the set of drive pinion gears 80 rather than multiple drive pinion gears or vice versa.

In at least one configuration, a first clutch 150 and a second clutch 152 may be provided. The first clutch 150 may be axially positioned along the drive pinion axis 70 between the first gear 90 and the second gear 92 while the second clutch 152 may be axially positioned along the drive pinion axis 70 between the second gear 92 and the third gear 94. The first clutch 150 and the second clutch 152 may be configured to selectively couple a single gear or multiple gears to the drive pinion 26 as will be discussed in more detail below. It is contemplated that a single actuator may be provided to actuate multiple clutches, like the first clutch 150 and the second clutch 152 or that different actuators may actuate different clutches.

The first clutch 150 may be operatively connected to a first actuator 160 that may be configured to move the first clutch 150 along the drive pinion axis 70. For example, a linkage 162, such as a shift fork, may operatively connect the first clutch 150 to the first actuator 160. The first actuator 160 may be of any suitable type. For example, the first actuator 160 may be an electrical, electromechanical, pneumatic, or hydraulic actuator. In at least one configuration, such as when the first clutch 150 is a clutch collar or dog clutch, the first actuator 160 may move the first clutch 150 along the drive pinion axis 70 and may execute a shift when the rotational speed of the first clutch 150 and a corresponding member of the set of drive pinion gears 80 are sufficiently synchronized to complete a shift so that the teeth of the first clutch 150 may mesh with teeth on a drive pinion gear or so that the teeth of the first clutch 150 gear may disengage from teeth on a drive pinion gear. The control system 34 may monitor and/or control operation of the first actuator 160.

The second clutch 152 may be operatively connected to a second actuator 170 that may be configured to move the second clutch 152 along the drive pinion axis 70. It is also contemplated that a single actuator may be provided to actuate multiple clutches, like the first clutch 150 and the second clutch 152. For example, a linkage 172, such as a shift fork, may operatively connect the second clutch 152 to the second actuator 170. The second actuator 170 may be of any suitable type. For example, the second actuator 170 may be an electrical, electromechanical, pneumatic, or hydraulic actuator. In at least one configuration, such as when the second clutch 152 is a clutch collar or dog clutch, the second actuator 170 may move the second clutch 152 along the drive pinion axis 70 and may execute a shift when the rotational speed of the second clutch 152 and a corresponding member of the set of drive pinion gears 80 are sufficiently synchronized to complete a shift so that the teeth of the second clutch 152 may mesh with teeth on a drive pinion gear or so that the teeth of the second clutch 152 gear may disengage from teeth on a drive pinion gear. The control system 34 may monitor and/or control operation of the second actuator 170.

Sufficient synchronization to permit shifting or movement of a clutch, like the first clutch 150 or the second clutch 152, may be attained using a gear synchronizer, by controlling the rotational speed of the rotor 54, or combinations thereof. Such synchronization components or control actions may be omitted with different clutch configurations, such as a clutch that is a disc clutch.

Referring to FIGS. 1-4, examples of different clutch positions are shown. The control system 34 may actuate the first clutch 150 and the second clutch 152 to a desired position based on an operator input or an automated shift control routine. The rotor shaft 24 and set of countershaft gears 82 may rotate about the first axis 60 when the rotor 54 rotates about the first axis 60 in the clutch positions described below.

Referring to FIG. 1, the first clutch 150 and the second clutch 152 are shown in neutral positions. The first clutch 150 may not couple a gear of the set of drive pinion gears 80 to the drive pinion 26 when the first clutch 150 is in the neutral position. For instance, the first clutch 150 may not couple the first gear 90 or the second gear 92 to the drive pinion 26 when the first clutch 150 is in the neutral position. Likewise, the second clutch 152 may not couple a gear of the set of drive pinion gears 80 to the drive pinion 26 when the second clutch 152 is in the neutral position. For instance, the second clutch 152 may not couple the second gear 92 or the third gear 94 to the drive pinion 26 when the second clutch 152 is in the neutral position. The drive pinion 26 may be free to rotate about the drive pinion axis 70 with respect to at least one member of the set of drive pinion gears 80 when a clutch is in the neutral position and may be free to rotate about the drive pinion axis 70 with respect to all members of the set of drive pinion gears 80 when all clutches are in their respective neutral positions. Thus, torque is not transmitted between the electric motor 22 and the drive pinion 26 when the first clutch 150 and the second clutch 152 are in their respective neutral positions.

Figure 2:
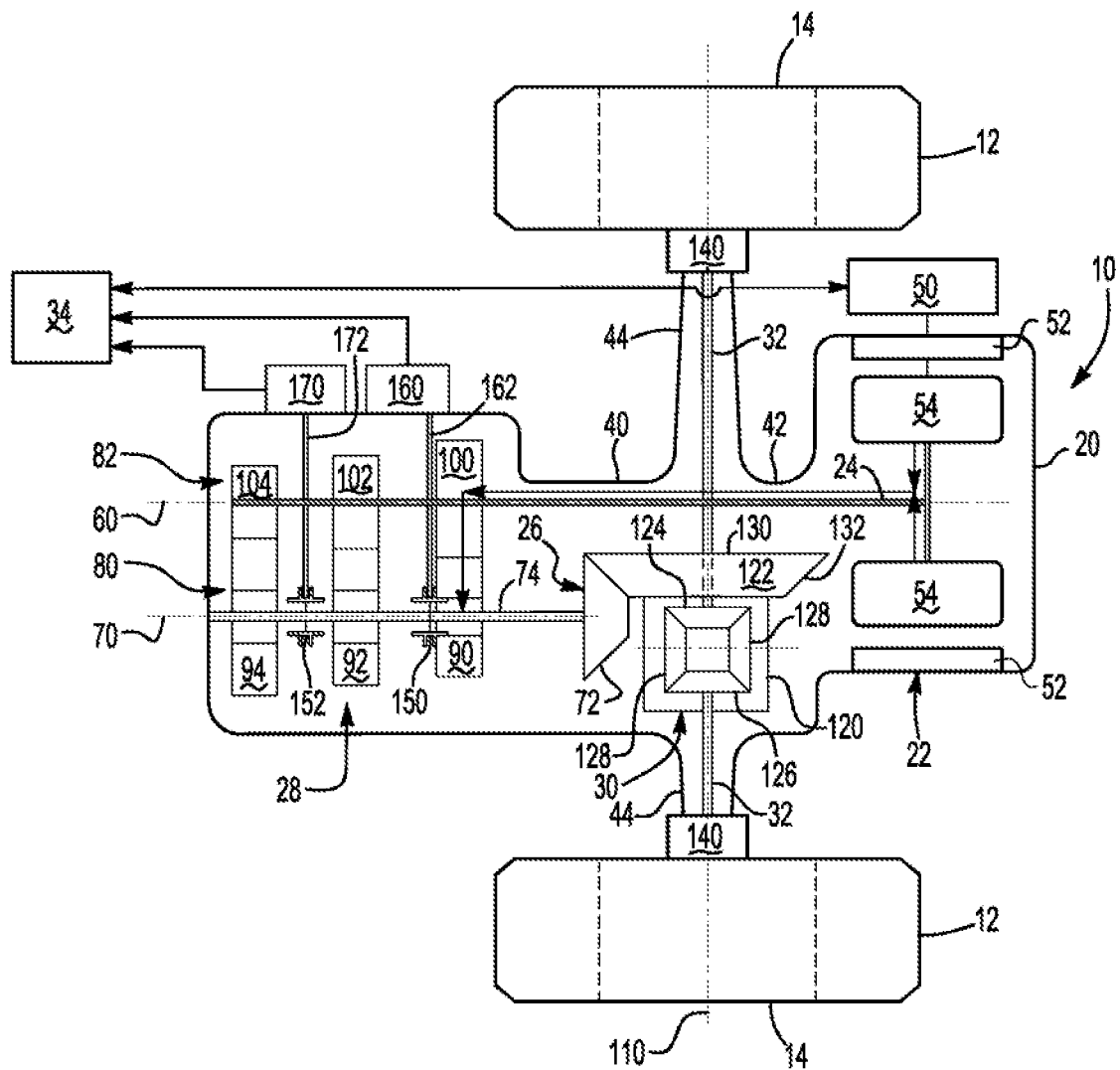
FIG. 2 illustrates the axle assembly with a first gear ratio engaged.
Figure 3A:
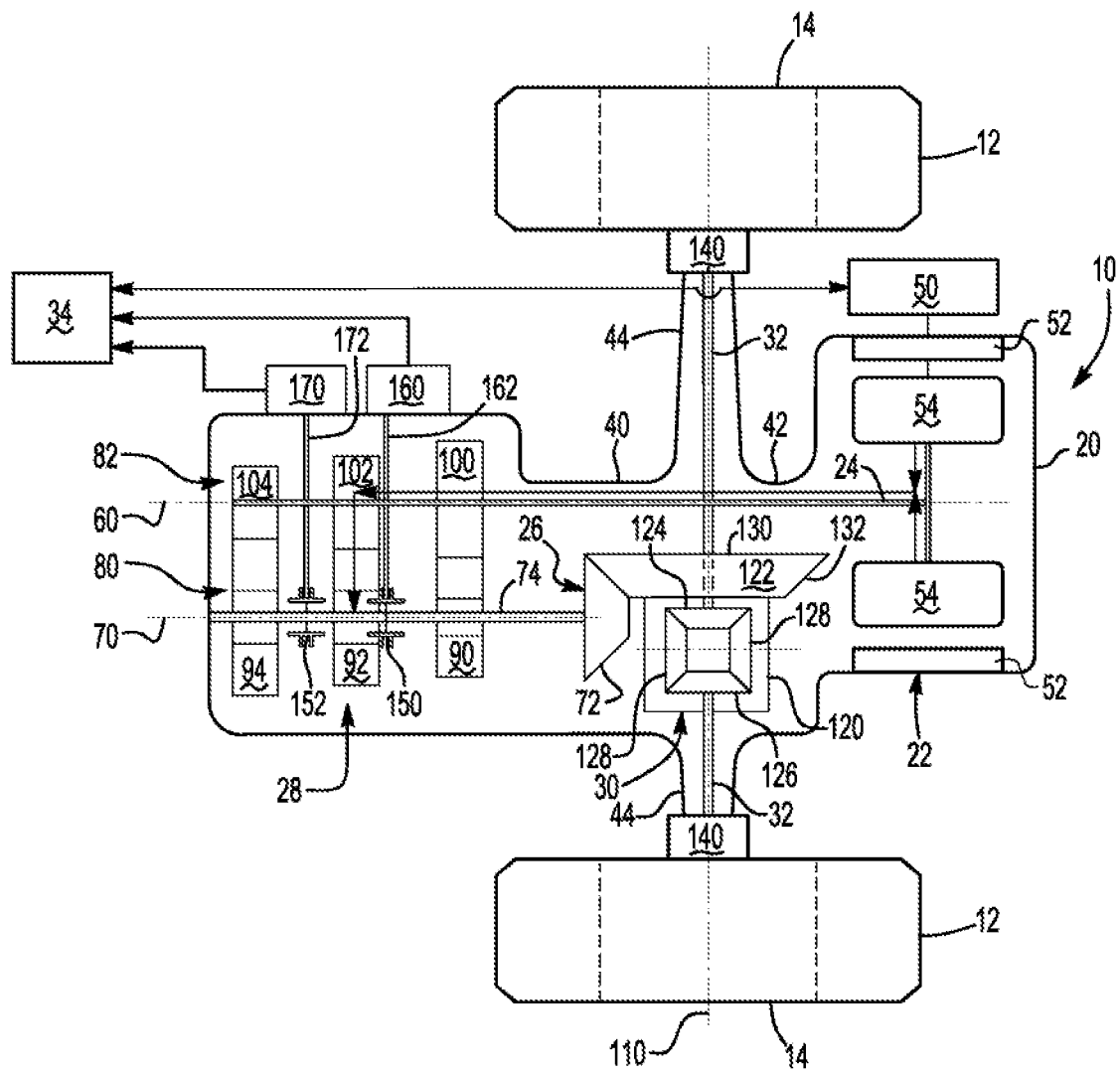
FIGS. 3A and 3B illustrate the axle assembly with a second gear ratio engaged.
Figure 3B:
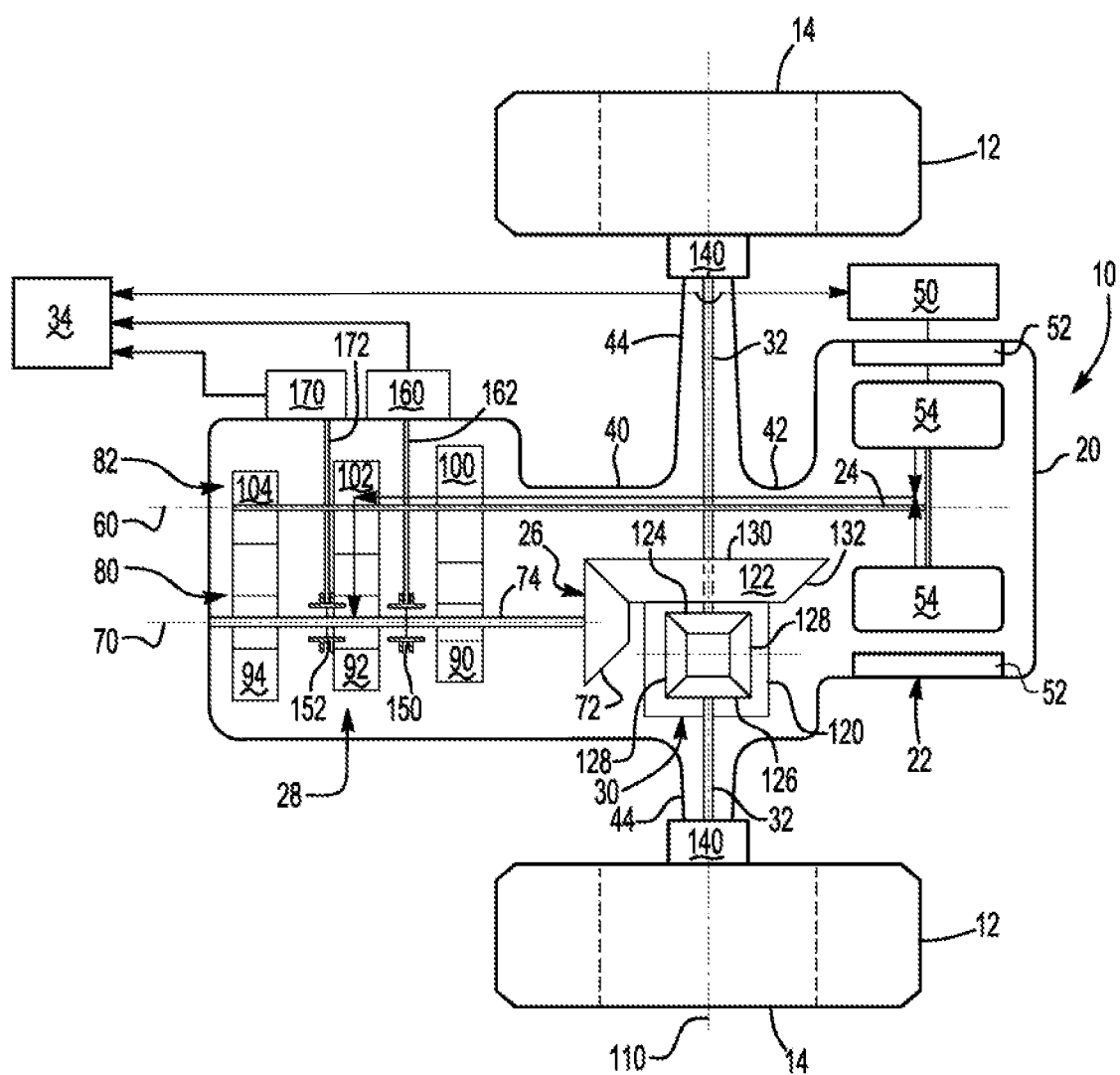
Figure 4:
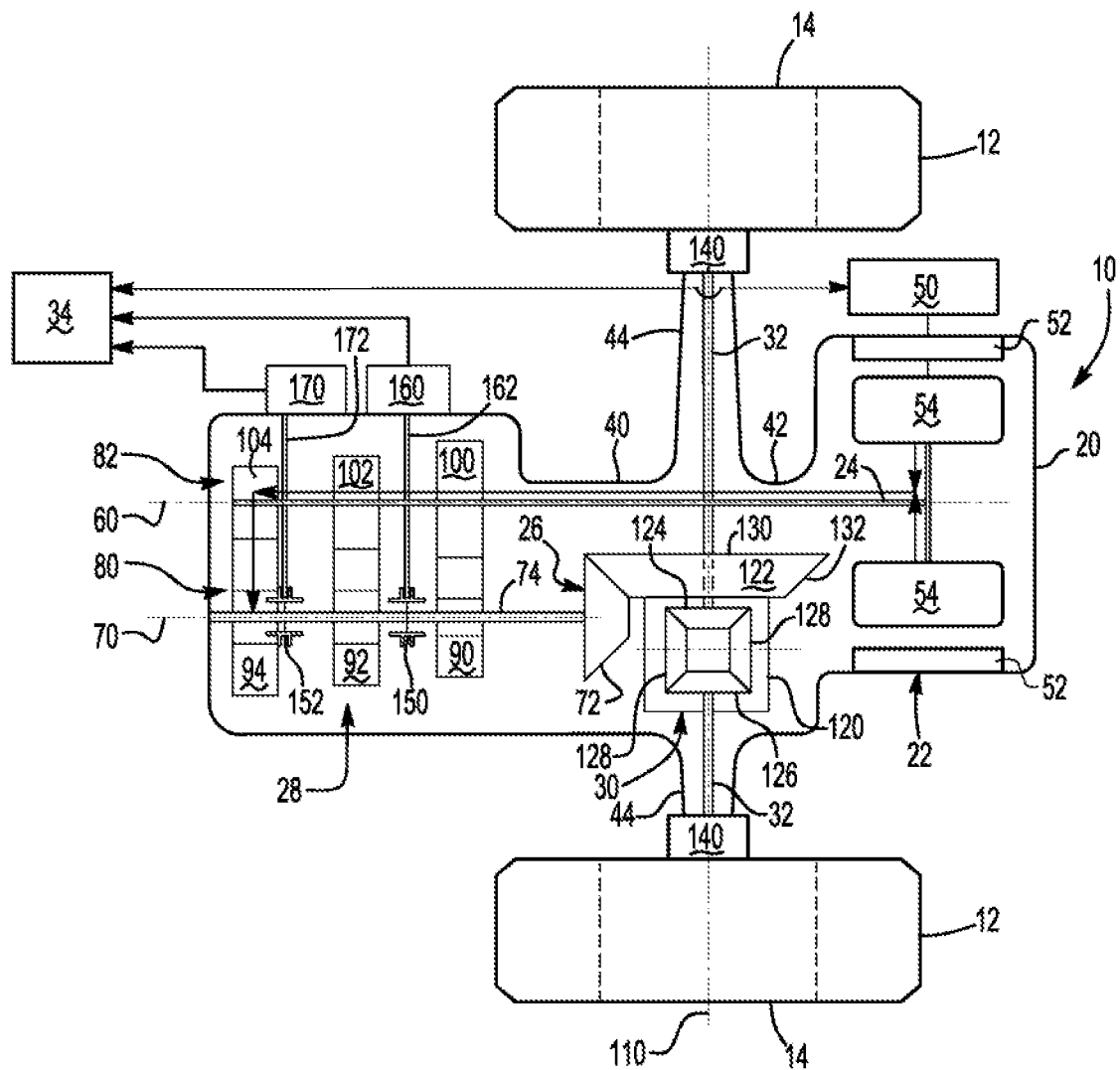
FIG. 4 illustrates the axle assembly with a third gear ratio engaged.

As an overview of the configurations shown in FIGS. 2-4, torque may be transmitted between the electric motor 22 and the drive pinion 26 when one member of the set of drive pinion gears 80 is coupled to the drive pinion 26 by a corresponding clutch and the other members of the set of drive pinion gears 80 are decoupled from the drive pinion 26 such that the drive pinion 26 is free to rotate about the drive pinion axis 70 with respect to a decoupled drive pinion gear. The straight arrowed lines in FIGS. 2-4 that are not shown in FIG. 1 depict the torque transmission path from the electric motor 22 to the drive pinion 26, and hence to the differential assembly 30; however, it is to be understood that the torque transmission path may be reversed in each of these figures and torque may be transmitted from the differential assembly 30 to the drive pinion 26 and then to the electric motor 22 via the countershaft transmission 28 and the rotor shaft 24.

Referring to FIG. 2, the first clutch 150 is shown in a first position and the second clutch 152 is shown in the neutral position. The first clutch 150 may be moved to the first position by the first actuator 160. In the first position, the first clutch 150 may couple the first gear 90 to the drive pinion 26 such that the first gear 90 rotates about the drive pinion axis 70 with the drive pinion 26. Thus, the rotor 54, the rotor shaft 24, and the set of countershaft gears 82 are rotatable together about the first axis 60 while the first gear 90 and the drive pinion 26 are rotatable together about the drive pinion axis 70. The second gear 92 and the third gear 94 are not coupled to the drive pinion 26 by a clutch. Accordingly, the second countershaft gear 102 and the third countershaft gear 104 may rotate the second gear 92 and the third gear 94, respectively, about the drive pinion axis 70, but torque may not be transmitted to or from the drive pinion 26 via the second gear 92 or the third gear 94 since these gears are decoupled from the drive pinion 26. Thus, torque may be transmitted between the electric motor 22 and the drive pinion 26 via the first gear 90 when the first clutch 150 couples the first gear 90 to the drive pinion 26 such that the first gear 90 rotates about the drive pinion axis 70 with the drive pinion 26. A first gear ratio is provided when the first gear 90 is coupled to the drive pinion 26.

Referring to FIGS. 3A and 3B, two different examples are shown that illustrate the transmission of torque via the second gear 92. In FIGS. 3A and 3B, a second gear ratio is provided when the second gear 92 is coupled to the drive pinion 26. The second gear ratio may differ from the first gear ratio.

In FIG. 3A, the first clutch 150 is shown in a second position and the second clutch 152 is shown in the neutral position. The first clutch 150 may be moved to the second position by the first actuator 160. In the second position, the first clutch 150 couples the second gear 92 to the drive pinion 26 such that the second gear 92 rotates about the drive pinion axis 70 with the drive pinion 26. Accordingly, rotation of the rotor 54 may cause the rotor shaft 24 and the set of countershaft gears 82 to rotate together about the first axis 60, and torque may be transmitted to or from the drive pinion 26 via the second countershaft gear 102, the first clutch 150, and the second gear 92. The first gear 90 and the third gear 94 are not coupled to the drive pinion 26 via the first clutch 150 or the second clutch 152. Thus, torque may not be transmitted to or from the drive pinion 26 via the first gear 90 and the third gear 94 since these gears are decoupled from the drive pinion 26. Therefore, torque is transmitted between the electric motor 22 and the drive pinion 26 via the second gear 92 when the first clutch 150 does not couple the first gear 90 to the drive pinion 26 and the first clutch 150 couples the second gear 92 to the drive pinion 26 such that the second gear 92 rotates about the drive pinion axis 70 with the drive pinion 26.

In FIG. 3B, the second clutch 152 is shown in a first position and the first clutch 150 is shown in the neutral position. The second clutch 152 may be moved to the first position by the second actuator 170. In the first position, the second clutch 152 couples the second gear 92 to the drive pinion 26 such that the second gear 92 rotates about the drive pinion axis 70 with the drive pinion 26. Accordingly, rotation of the rotor 54 may cause the rotor shaft 24 to rotate about the first axis 60, and torque may be transmitted to or from the drive pinion 26 via the second countershaft gear 102, the second clutch 152, and the second gear 92. The first gear 90 and the third gear 94 are not coupled to the drive pinion 26 via the first clutch 150 or the second clutch 152. Thus, torque may not be transmitted to or from the drive pinion 26 via the first gear 90 and the third gear 94 since these gears are decoupled from the drive pinion 26. Therefore, torque is transmitted between the electric motor 22 and the drive pinion 26 via the second gear 92 when the first clutch 150 does not couple the first gear 90 to the drive pinion 26 and the second clutch 152 couples the second gear 92 to the drive pinion 26 such that the second gear 92 rotates about the drive pinion axis 70 with the drive pinion 26.

In FIG. 4, the second clutch 152 is shown in a second position and the first clutch 150 is shown in the neutral position. The second clutch 152 may be moved to the second position by the second actuator 170. In the second position, the second clutch 152 couples the third gear 94 to the drive pinion 26 such that the third gear 94 rotates about the drive pinion axis 70 with the drive pinion 26. Accordingly, rotation of the rotor 54 may cause the rotor shaft 24 and the set of countershaft gears 82 to rotate together about the first axis 60, and torque may be transmitted to or from the drive pinion 26 via the third countershaft gear 104, the second clutch 152, and the third gear 94. The first gear 90 and the second gear 92 are not coupled to the drive pinion 26 via the first clutch 150 or the second clutch 152. Thus, torque may not be transmitted to or from the drive pinion 26 via the first gear 90 and the second gear 92 since these gears are decoupled from the drive pinion 26. Therefore, torque is transmitted between the electric motor 22 and the drive pinion 26 via the third gear 94 when the first clutch 150 does not couple the first gear 90 or the second gear 92 to the drive pinion 26 and the second clutch 152 couples the third gear 94 to the drive pinion 26 such that the third gear 94 rotates about the drive pinion axis 70 with the drive pinion 26. A third gear ratio is provided when the third gear 94 is coupled to the drive pinion 26. The third gear ratio may differ from the first gear ratio and the second gear ratio.

Figure 5:
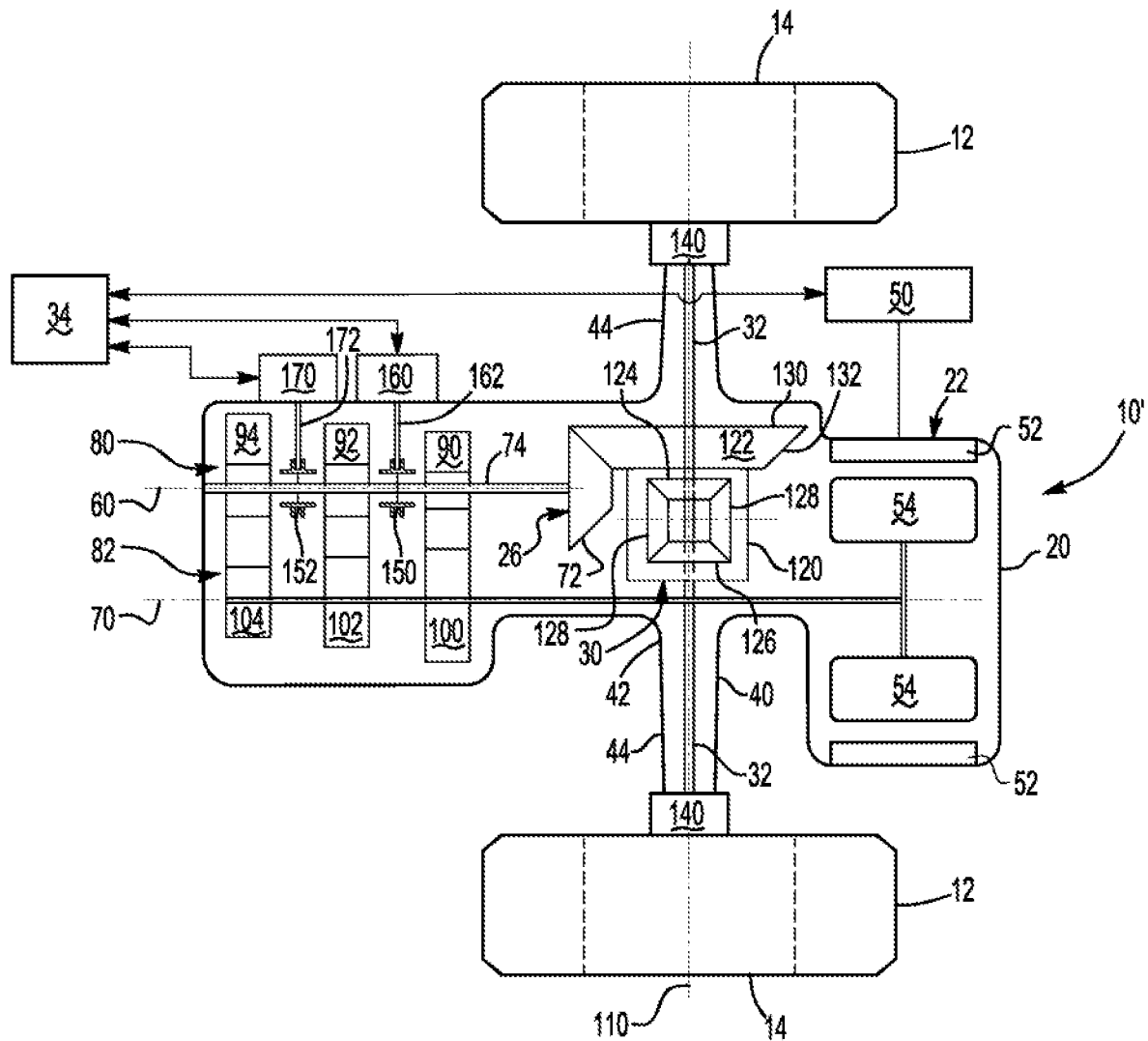
FIG. 5 shows another example of an axle assembly having a countershaft transmission in a neutral position.

Referring to FIG. 5, an axle assembly 10' is shown that is similar to the configuration shown in FIG. 1. In FIG. 1 and FIG. 5, the electric motor 22 and countershaft transmission 28 are positioned on opposite sides of the differential assembly 30 and may thus be positioned on opposite sides of the second axis 110. However, the positioning of the electric motor 22, rotor shaft 24, drive pinion 26, countershaft transmission 28, and differential assembly 30 is different in FIGS. 1 and 5. In FIG. 1, the back side 130 of the ring gear 122 may face toward the rotor shaft 24 and the ring gear teeth 132 may face away from the rotor shaft 24. The ring gear 122 may be positioned closer to the rotor shaft 24 than other components of the differential assembly 30, such as the differential case 120, the first differential gear 124, the second differential gear 126, the pinion gears 128, or combinations thereof. In FIG. 5, the back side 130 of the ring gear 122 may face away from the rotor shaft 24 and the ring gear teeth 132 may face toward the rotor shaft 24. The ring gear 122 may be positioned further from the rotor shaft 24 than other components of the differential assembly 30, such as the differential case 120, the first differential gear 124, the second differential gear 126, the pinion gears 128, or combinations thereof.

The axle assembly configurations discussed above may provide an axle assembly configuration in which the electric motor and countershaft transmission are arranged on opposite sides of a differential assembly and a center portion of an axle housing. Such a configuration may help thermally separate the electric motor and heat generated by the fast-spinning rotor roller bearings (which may rotate at speeds greater than 50,000 rpm) from other components of the axle assembly, such as the countershaft transmission and lubricant of the axle assembly. This thermal separation may improve thermal management of the axle assembly and may reduce lubricant heating, which may help improve lubricant life. In addition, such an arrangement may provide better weight distribution by locating the center of mass of the axle assembly closer to the axle shafts as compared to a configuration in which the electric motor and countershaft transmission extend from the same side of the housing assembly. As a result, the "standout" or distance the housing assembly extends from the axle shafts may be reduced and housing structural integrity may be improved as compared to a configuration in which the electric motor and countershaft transmission extend from the same side of the housing assembly. The axle assembly may provide multiple gear ratios with a single set of countershaft gears, which may provide gear reduction with fewer gears as compared to a dual countershaft arrangement having two sets of countershaft gears arranged on separate countershafts, which may reduce cost and weight and may help reduce the size of the axle assembly. The configurations described above may also allow a modular countershaft transmission to be provided with multiple gears mounted to a corresponding countershaft without independent bearings for associated gears.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
an electric motor having a rotor that is rotatable about a first axis;
a rotor shaft that is operatively connected to the rotor and is rotatable about the first axis;
a drive pinion that is rotatable about a drive pinion axis;
a countershaft transmission that operatively connects the rotor shaft to the drive pinion; and
a differential assembly that is operatively connected to the drive pinion, wherein the electric motor and the countershaft transmission are positioned on opposite sides of the differential assembly, the differential assembly has a ring gear that has a back side and a set of ring gear teeth that face away from the back side and mesh with a gear portion of the drive pinion, and the back side faces away from the rotor shaft.

2. The axle assembly of claim 1 wherein the differential assembly is rotatable about a second axis that is disposed substantially perpendicular to the first axis, and the differential assembly is positioned between the electric motor and the countershaft transmission such that the electric motor and the countershaft transmission are positioned on opposite sides of the second axis.

3. The axle assembly of claim 1 wherein the differential assembly is rotatable about a second axis and is positioned between the electric motor and the countershaft transmission such that the electric motor and the countershaft transmission are positioned on opposite sides of the second axis.

4. The axle assembly of claim 1 wherein the differential assembly has a differential case, the ring gear is fixedly mounted to the differential case such that the differential case and the ring gear are rotatable about a second axis, and the differential case is disposed closer to the rotor shaft than the ring gear is positioned to the rotor shaft.

5. An axle assembly comprising:
an electric motor having a rotor that is rotatable about a first axis;
a rotor shaft that is operatively connected to the rotor and is rotatable about the first axis;
a drive pinion that is rotatable about a drive pinion axis;
a countershaft transmission that operatively connects the rotor shaft to the drive pinion; and
a differential assembly that is operatively connected to the drive pinion, wherein the electric motor and the countershaft transmission are positioned on opposite sides of the differential assembly, the differential assembly has a ring gear that has a back side and a set of ring gear teeth that face away from the back side and mesh with a gear portion of the drive pinion, and the back side faces toward the rotor shaft.

6. The axle assembly of claim 5 wherein the differential assembly has a differential case, the ring gear is fixedly mounted to the differential case such that the differential case and the ring gear are rotatable about a second axis, and the ring gear is disposed closer to the rotor shaft than the differential case is positioned to the rotor shaft.

7. An axle assembly comprising:
an electric motor having a rotor that is rotatable about a first axis;
a rotor shaft that is operatively connected to the rotor and is rotatable about the first axis;
a drive pinion that is rotatable about a drive pinion axis;
a countershaft transmission that operatively connects the rotor shaft to the drive pinion; and
a differential assembly that is operatively connected to the drive pinion, wherein the electric motor and the countershaft transmission are positioned on opposite sides of the differential assembly, the differential assembly has a differential case and a ring gear that is fixedly mounted to the differential case such that the differential case and the ring gear are rotatable about a second axis, and the ring gear is disposed closer to the rotor shaft than the differential case is positioned to the rotor shaft.

8. An axle assembly comprising:
an electric motor having a rotor that is rotatable about a first axis;
a rotor shaft that is operatively connected to the rotor and is rotatable about the first axis;
a drive pinion that is rotatable about a drive pinion axis;
a countershaft transmission that operatively connects the rotor shaft to the drive pinion; and
a differential assembly that is operatively connected to the drive pinion, wherein the electric motor and the countershaft transmission are positioned on opposite sides of the differential assembly, the differential assembly has a differential case and a ring gear that is fixedly mounted to the differential case such that the differential case and the ring gear are rotatable about a second axis, and the differential case is disposed closer to the rotor shaft than the ring gear is positioned to the rotor shaft.

9. An axle assembly comprising:
an electric motor having a rotor that is rotatable about a first axis;
a rotor shaft that is operatively connected to the rotor and is rotatable about the first axis;
a drive pinion that is rotatable about a drive pinion axis that is spaced apart from the first axis;
a countershaft transmission that operatively connects the rotor shaft to the drive pinion, wherein the countershaft transmission includes a set of countershaft gears that are fixedly coupled to the rotor shaft and a set of drive pinion gears that are selectively couplable to the drive pinion, wherein the set of countershaft gears includes a first countershaft gear and a second countershaft gear that are rotatable about the first axis, and the set of drive pinion gears includes a first gear and a second gear that are rotatable about the drive pinion axis and through which the drive pinion extends, wherein the first countershaft gear meshes with the first gear, the first gear is selectively couplable to the drive pinion, the second countershaft gear meshes with the second gear, and the second gear is selectively couplable to the drive pinion;
a differential assembly that is operatively connected to the drive pinion, wherein the electric motor and the countershaft transmission are positioned on opposite sides of the differential assembly;
a first clutch that selectively couples the first gear to the drive pinion; and
a second clutch that selectively couples the second gear to the drive pinion, wherein torque is transmitted between the electric motor and the drive pinion via the second gear when the first clutch does not couple the first gear to the drive pinion and the second clutch couples the second gear to the drive pinion such that the second gear rotates about the drive pinion axis with the drive pinion.

10. The axle assembly of claim 9 wherein torque is transmitted between the electric motor and the drive pinion via the first countershaft gear and the first gear when the first clutch couples the first gear to the drive pinion such that the first gear rotates about the first axis with the drive pinion.

11. The axle assembly of claim 9 wherein the first countershaft gear is positioned along the first axis between the second countershaft gear and the electric motor and the first gear is positioned along the drive pinion axis between the second gear and the differential assembly.

12. The axle assembly of claim 9 wherein the first clutch selectively couples the second gear to the drive pinion, wherein torque is transmitted between the electric motor and the drive pinion via the second gear when the first clutch does not couple the first gear to the drive pinion and the first clutch couples the second gear to the drive pinion such that the second gear rotates about the drive pinion axis with the drive pinion.

13. The axle assembly of claim 9 wherein the set of countershaft gears includes a third countershaft gear that is rotatable about the first axis, and the set of drive pinion gears includes a third gear that is rotatable about the drive pinion axis and through which the drive pinion extends, wherein the third countershaft gear meshes with the third gear and the third gear is selectively couplable to the drive pinion.

14. The axle assembly of claim 13 wherein the second countershaft gear is positioned closer to the electric motor than the third countershaft gear and the second countershaft gear is positioned along the first axis between the first countershaft gear and the third countershaft gear.

15. The axle assembly of claim 13 wherein a first gear ratio is provided when the first gear is coupled to the drive pinion, a second gear ratio is provided when the second gear is coupled to the drive pinion, and a third gear ratio is provided when the third gear is coupled to the drive pinion, wherein the first gear ratio differs from the second gear ratio and the third gear ratio, and the second gear ratio differs from the third gear ratio.

16. The axle assembly of claim 13 wherein the second clutch selectively couples the third gear to the drive pinion, and wherein torque is transmitted between the electric motor and the drive pinion via the third gear when the first clutch does not couple the first gear to the drive pinion and the second clutch couples the third gear to the drive pinion such that the third gear rotates about the drive pinion axis with the drive pinion.

17. The axle assembly of claim 16 wherein torque is not transmitted between the electric motor and the drive pinion when the first clutch is in a neutral position and the second clutch is in a neutral position such that the first gear, the second gear, and the third gear are rotatable about the drive pinion axis with respect to the drive pinion.

18. The axle assembly of claim 16 wherein the first clutch is axially positioned between the first gear and the second gear, the second clutch is axially positioned between the second gear and the third gear, the first clutch receives the drive pinion and is rotatable about the drive pinion axis with the drive pinion, the second clutch receives the drive pinion and is rotatable about the drive pinion axis with the drive pinion, a first actuator actuates the first clutch along the drive pinion axis, and a second actuator actuates the second clutch along the drive pinion axis.

19. The axle assembly of claim 9 wherein the differential assembly has a ring gear that has a back side and a set of ring gear teeth that face away from the back side and mesh with a gear portion of the drive pinion and the back side faces toward the rotor shaft.

20. The axle assembly of claim 9 wherein the differential assembly has a ring gear that has a back side and a set of ring gear teeth that face away from the back side and mesh with a gear portion of the drive pinion and the back side faces away from the rotor shaft.

* * * * *